March 25, 1958     J. J. J. STAUNTON     2,828,466
ALTERNATING CURRENT pH ELECTROMETER Filed June 3, 1950     2 Sheets-Sheet 1

Fig. 1

Inventor
John J. J. Staunton
By
McCanna and Morsbach
Attys.

March 25, 1958   J. J. J. STAUNTON   2,828,466
ALTERNATING CURRENT pH ELECTROMETER
Filed June 3, 1950   2 Sheets-Sheet 2
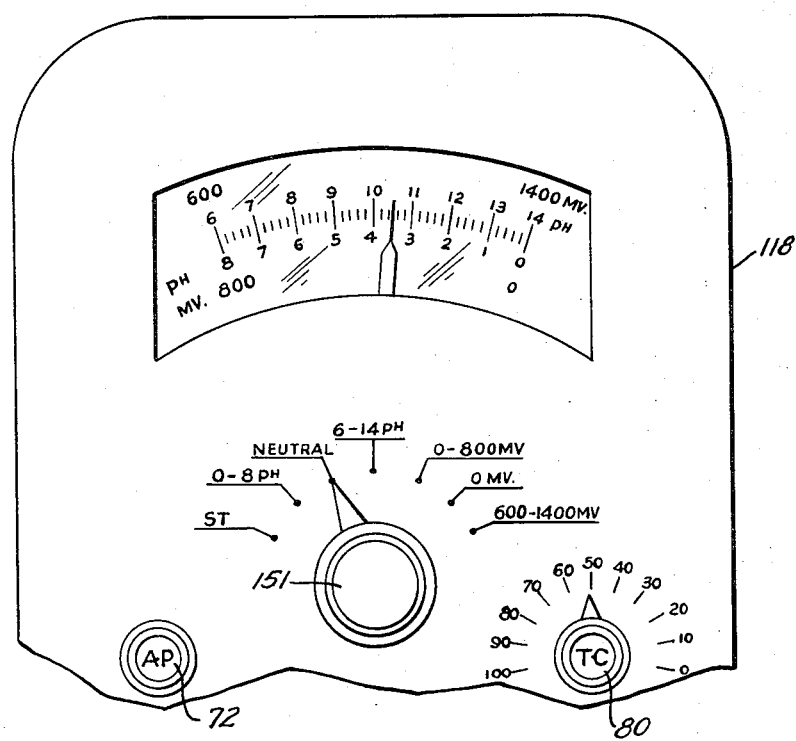
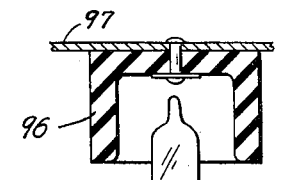
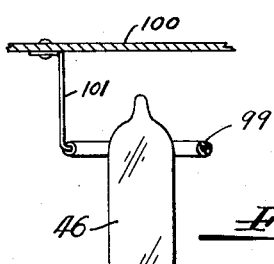
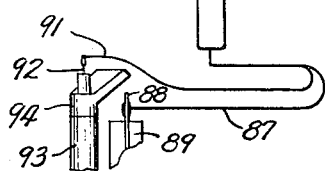
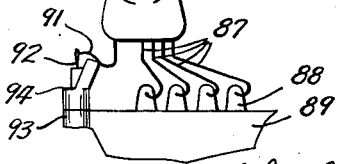
Inventor
John J. J. Staunton
By
McCanna and Morsbach
Attys.

United States Patent Office 2,828,466
Patented Mar. 25, 1958

2,828,466
ALTERNATING CURRENT pH ELECTROMETER

John J. J. Staunton, Oak Park, Ill., assignor to Coleman Instruments, Inc., Maywood, Ill., a corporation of Illinois Application June 3, 1950, Serial No. 165,959

10 Claims. (Cl. 324—30)

This invention relates to an instrument or circuit for measuring potentials having a relatively low value and more particularly to an instrument for measuring pH and millivolts.

An object of the present invention is the provision of an instrument of the above character having a direct current negative feed-back amplifier with novel means for regulating the voltage at the output of the power supply for the amplifier.

Another object of the invention is the provision of an instrument of the aforegoing character having an amplifier energized by a direct current voltage supply, the output of which is regulated, with novel means for compensating for small residual variations in the voltage supply not adequately controlled by the regulator means.

Another object of the invention is the provision of an instrument of the above character having an amplifier circuit including an electronic tube and a conductor for connecting the grid of the electronic tube to one side of the source of potential to be measured with guard circuit means for said conductor adapted to be energized to a potential substantially equal to that of the grid input at the time of taking a measurement with the instrument.

Another object of the invention is the provision of an instrument of the above character utilizing electronic equipment that has a high speed of response, that minimizes drift, that is rugged and that is relatively inexpensive to produce.

Another object of the invention is the provision in an instrument of the above character with means for limiting potential build-up in the circuit therein.

Another object of the invention is the provision of novel means for mounting electronic tubes that protects the latter from microphonics.

Other objects and advantages of the invention will become apparent from the following detailed description taken in connection with the accompanying drawings, in which—

Figure 1 is a wiring diagram of an instrument circuit embodying the present invention;

Fig. 2 is a fragmentary plan view of the top of the instrument case showing the meter scale;

Fig. 3 is a side view of a tube and its mounting showing the details of construction, and Fig. 4 is an end view of the tube shown in Fig. 4 with a modification of the support for the top of the tube.

Referring now to the drawings the invention is shown embodied in an instrument adapted for measuring pH, millivolts and relatively low value potentials. In general, the instrument includes a negative feed-back amplifier adapted to be connected across a source of potential to be measured, indicating means associated with the amplifier for indicating the value of the source of potential being measured, a direct current power supply for energizing the amplifier and means for regulating and compensating the voltage of the power supply so as to minimize, if not entirely eliminate, the effects of variations of the direct current voltage supply in the amplifier circuit.

Direct current power supply

The direct current power supply may be of any suitable type as apparent to those skilled in the art. For purposes of illustrating the invention, the power supply in this embodiment of the invention includes (see Figure 1) a transformer 11 and a rectifier tube 12. The primary winding of the transformer is adapted to be connected to a suitable alternating current supply as by conductors 13 and 14. The filaments of the tube 12 are connected across a secondary winding 16 of the transformer 11 by conductors 17 and 18 while the plates of the tube are connected to another secondary winding 19 of the transformer 11 by conductors 21 and 22. A conductor 23 connected to the midpoint on the winding 19 of the transformer 11 forms the negative output conductor of the power supply and a conductor 24 connected to conductor 17 forms the positive output conductor of the power supply. A condenser 26 is connected between the conductor 23 and the conductor 24. In this instance the rectifier is designed to have an output voltage of 350 volts.

Voltage regulation means

The voltage regulation means in this embodiment of the invention comprises in general a pair of gas tubes 28 and 29, such as a VR-150 tube and a VR-75 tube, respectively, connected in cascade relation across the output conductors 23 and 24 of the power supply. As shown, the gas tube 28 is connected to the positive conductor 24 of the power supply by a conductor 31, a resistance 32, rated 30 ohms, and a resistance 33, rated 600 ohms, and to the negative output conductor 23 by a conductor 34. A ballast lamp 36 is connected in series with the output conductor 23. The gas tube 29 is connected across the gas tube 28 by the conductors 31 and 37 and conductors 38 and 40. A ballast lamp 39 and a resistance 41, rated 500 ohms, are connected in series in the conductor 38 as shown.

The tube 28 effects primary voltage regulation of the output of the power supply and in normal operation this tube receives its current through the ballast lamp 36. The resistances 32 and 33 and the resistance of the ballast lamp 36 are of such value that the sum of the current drawn by the regulator tube 28 and the rest of the circuit effects a voltage drop of about 150 volts across the ballast lamp 36 and a drop of about 50 volts across the resistances 32 and 33. Thus, the rectifier output voltage of 350 volts is reduced to 150 volts at the terminals of the regulator tube 28, which is its normal operating voltage. The tube 28 operates so that if the line voltage of the power supply rises, the tube automatically draws more current and the increased drop across the ballast lamp 36 and across the resistances 32 and 33 increase to absorb the rise in the supply voltage so that the tube 28 maintains essentially 150 volts across its terminals.

The regulator tube 29 is connected so that it is supplied a voltage from the regulator tube 28 after a further drop of 75 volts has been taken through the ballast lamp 39 and the resistance 41. The tube 29 operates in the same manner as the tube 28 except instead of having a large voltage change to absorb, it has only a small residual voltage change of a couple of volts and accordingly, the current change through the tube 29 is very small. It is to be understood that in operation any increase in current in the circuit of the tube 29 effects an increased drop across the ballast lamp 39 and the resistance 41 which counteracts or absorbs the change in voltage supplied to the tube 29 from the tube 28 so that the voltage across the terminals of the tube 29 is substantially 75 volts. Where desired resistances could be substituted for the ballast lamps 36 and 39. One advantage of using the lamps however is that the lamps tend to change their resistance with increases in current; that is, the resistance increases as the current increases through the lamp thereby giving a voltage drop which changes more rapidly than the current. This gives a greatly enhanced regulator action. Furthermore, a ballast lamp is an inexpensive way as well as an effective way of providing a resistance which consumes a very large amount of power such as these resistances are required to do.

Amplifier circuit

The amplifier circuit is of the direct current negative feed-back type and in general includes three electronic tubes 46, 47 and 48, input conductors 49 and 51, a bleeder resistance connected across the voltage regulator tube 29 by conductors 37 and 31 and a conductor 53 interconnected with the conductor 40. As shown, the bleeder resistance includes an asymmetry potential adjustment resistance or potentiometer 54, series connected resistances 55 and 60 in parallel with the resistance 54, a potentiometer 50, and resistances 56, 57, 59, 59, 61 and 62. The resistance 54 is interconnected with the junction between the resistance 55 and 60 by a conductor 75. The purpose of this construction is to improve the linearity of the control 54. In this embodiment of the invention the potentiometer 50 has a resistance rating of 100 ohms, the potentiometer 54 has a resistance rating of 80 ohms, the resistances 55 and 60 each have a rating of 10 ohms, the resistance 56 has a rating of 150 ohms, the resistance 57 has a rating of 105 ohms, the resistance 58 has a rating of 405 ohms, the resistance 59 has a rating of 150 ohms, the resistance 61 has a rating of 430 ohms and the resistance 62 has a rating of 2260 ohms. The potentiometer 54 may be adjusted by a knob 72 (see Fig. 2) accessible from the exterior of the instrument.

The input conductor 49 forms a connection between the grid of the tube 46 and a glass electrode 63 such as utilized in effecting pH measurements, while the input conductor 51, which is connected at one end to the reference electrode 65 is connected at its opposite end to a feed-back resistance selector switch 64. The latter connects the input conductor 51 with a fixed resistance 66, rated 700 ohms, when the instrument is used for measuring millivolts and with a fixed resistance 67, rated 360 ohms, and a potentiometer 68 having a resistance rating of 200 ohms, connected in series when the instrument is used for measuring pH. The potentiometer 68 may be adjusted by means of a control knob 80 (see Fig. 2). The fixed resistance 67 and the potentiometer 68 are interconnected by a conductor 69 in turn connected to a variable tap on the potentiometer 54. The purpose of the potentiometer 68 is to permit compensation for the difference in voltage swing of a glass electrode at different temperatures. The potentiometer 68 may be either a manually adjustable resistor actuated by a dial on the outside of the instrument having a pointer associated with a scale marked in degrees centigrade or it may be a resistance thermometer of a suitable wire such as nickel, which upon being immersed in the solution being measured, will automatically change the resistance to give the desired range for the proper temperature. A switch 70 is connected in series with the input conductor 49 and a switch 71 is connected in series with the conductor 51 for purposes of isolating the amplifier circuit from the electrodes 63 and 65.

The tube 46 has its filament connected in parallel with the resistance 57. The plate of the tube 46 is connected to a juncture 73 between the resistance 32 and 33 by a conductor 74 to provide proper plate voltage for operating the tube 46. A resistance 76, rated 4.7 megohms, and a switch 77, for disconnecting the plate from the plate potential supply, are connected in series in the conductor 74 as shown in the drawings. The screen grid of the tube 46 is connected to the bleeder resistance at a position between the resistances 58 and 59 by a conductor 78, a switch 79 being connected in series in the conductor 78 for disconnecting the screen grid from the source of power. The grid of the tube 47 is connected to the plate of the tube 46 by a conductor 81 and the conductor 74 and the plate of the tube 47 is connected to the positive output conductor 24 by a conductor 82, a resistance 83, rated 4.7 megohms, being connected in series in the conductor 82 for a conventional purpose. The screen grid of the tube 47 is connected to the bleeder resistance at a point between the resistances 61 and 62 by a conductor 84 to provide the proper biasing voltage.

As shown diagrammatically in Figure 1 the tubes 46 and 47, which are of a subminiature type, are disposed in a shielded enclosure 86 for purposes of isolating the tubes so that there will be a minimum of outside interference with the input circuit and the tubes are mounted to be protected from microphonics; i. e., change in operating characteristics due to the mechanical displacement of internal elements of the tube due to shock. To this end as best seen in Figs. 3 and 4, the tube leads 87 are utilized for mounting the tubes. To accomplish this, the end portions of the leads 87 remote from the tube 46 are soldered to terminal tabs 88 mounted on an insulating strip 89 suitably supported in the instrument. The end portions of the leads adjacent the tube are bent back so as to overlie the fixed end portions as best seen in Fig. 3. The grid lead 91 of the tube 46 is connected to a tab 92 projecting upwardly from a mounting post 93 supported in the instrument and is bent back upon itself as shown. A metal guard or shield 94 is disposed between the grid lead 91 and the post 93 to shield the grid from the other leads 87. By utilizing the tube leads in this manner a very resilient support means for the tubes is provided. The tubes are of such mass as compared to the leads, that the tubes with this resilient mounting will have only a relatively low frequency displacement or vibration irrespective of how sudden a shock is applied to the instrument. This low frequency vibration is not capable of producing displacement of the internal parts of the tube because these elements are of a very low mass and are very stiff, a combination which permits displacement only by high frequency or extremely rapid shock. Thus, in effect the vibration rate of the mounting and the tube is mis-matched with respect to the vibration rate of the internal structure of the tube. As a result of this deliberate mis-matching, shocks have little, if any, effect on the operation of these tubes. A resilient cup 96 (see Fig. 3), formed of rubber or the like material, is mounted on a bracket 97 as by a rivet so that the cup is spaced from, yet encircles, the top portion of the tube. This cup acts as a snubber and prevents excessive motion of the tube under shocks that would tend to overstress the comparatively weak tube leads and bend them to a point beyond the elastic limit of the material of the leads so that they would be permanently deformed. The snubber is normally spaced from the tube and has no function whatever when the instrument is subjected to minor shocks and vibrations.

Fig. 4 shows a modification of the support for the top of the tube in which the support may comprise a piece of resilient wire deformed to define a loop 99 encircling the tube as shown and a stem or bracket portion 101 attached to a crosspiece 100 for supporting the loop portion 99. Preferably the wire loop is provided with a resilient covering as shown.

The tube 48 is a power amplifier tube and is arranged so that its filament (see Figure 1) is connected to a secondary winding 103 of the transformer 11 as by conductors 104 and 106. The midpoint of the winding 103 is connected to the conductor 38 as shown by a conductor 107. The grid of the tube 48 is biased by a voltage obtained from a voltage divider formed by resistances 108 and 109 and connected to the plate of the tube 47 by a conductor 111, it being understood that the resistances 108 and 109 are proportioned so that the grid of the tube 48 is biased to the proper operating voltage. In this embodiment of the invention the resistance 108 is rated 3.6 megohms and the resistance 109 is rated 22 megohms. The plate of the tube 48 is connected to the positive voltage supply as by a conductor 112 having a resistance 113, rated 30,000 ohms, and a switch 114 connected in series therewith, the switch being for the purpose of disconnecting the plate from the potential source. The plate of the tube 48 is also connected to the selector switch 64 through conductors 116 and 117.

As seen in Figure 1 an indicating meter 118 is arranged to be connected in series with the conductor 116 to measure the plate current in the tube 48. Connected across the terminals of the meter is a shorting switch 119, a reversing switch 121, and an adjustable resistance 122, having a rating 400 ohms, and a switch 123 in series with the resistance 122 for connecting the resistance in circuit with the meter 118 and disconnecting it from the circuit. As seen in Fig. 2 the meter is graduated for both pH and millivolt measurements. The pH scales are calibrated from 0 to 8 pH from right to left as viewed in Fig. 2 and from 6 to 14 pH from left to right. Similarly, the millivolt scales run from 0–800 millivolts from right to left, as viewed in Fig. 2, and from 600 to 1400 millivolts from left to right. The mechanical zero of the needle of the meter 118 is normally at 7 pH or 700 millivolts; however, the meter is biased through a circuit including a resistance 124, rated 75,000 ohms, connected in series in the conductor 125 between the conductor 116 and the conductor 31 so that the meter normally reads on the right hand end of the scale as viewed in Fig. 2 when there is zero input to the instrument and the switch 119 is in its proper position. Thus, when the meter reads zero, full scale current is actually passing through the resistance 124 and conductor 125 despite the fact the current flowing through resistance 66 in the case millivolt measurements are being taken and the resistance 67 and potentiometer 68 in the case pH measurements are being taken, is zero. When determining values of pH higher than 7 pH or millivolts higher than 700 millivolts the position of the reversing switch 119 is changed to cause the current to flow through the meter in the reverse direction.

With reference to Figure 1 it will be seen that with the power supply operating to deliver rated voltage and all the resistances being of the proper value, the tubes 46, 47 and 48 will have the proper grid and plate voltages applied thereto. When a potential appears between the electrodes 63 and 65 a signal is impressed upon the grid of the tube 46. In a conventional manner the signal is amplified by the tubes 46, 47 and 48. The plate current of the tube 48 flows through the meter to cause a deflection thereof and also a voltage drop across the feedback resistance which is substantially the same as and in opposition to the voltage signal applied to the grid of the tube 46. Thus, the major part of the change in the voltage signal is compensated or counteracted by the change in voltage across the feed-back resistance. This principle is known as negative feed-back and its purpose is to stabilize the amplifier. With tubes 46, 47 and 48 of the characteristics described herein the voltage gain of the amplifier is approximately 8000 times so that with a voltage change of less than a millivolt applied to the grid of the tube 46 the needle of the meter 118 will be deflected to a full scale reading.

As can be seen from the wiring diagram the arrangement of the resistances 50 and 56 is such that any slight change in voltage across the resistances 50 and 56 will appear as a signal applied to the grid of the tube 46 and will be correspondingly amplified as is a signal impressed on the grid from an external source. It is important therefore that voltage variation in the line supply be minimized, if not entirely eliminated. The gas tubes 28 and 29 provide a high degree of regulation, nevertheless the change in voltage across the tube 29 may be a few millivolts in 75 volts, the operating voltage of the tube 29. This small change which appears across resistance 56 is still great enough to effect the input signal to the tube 46. In this embodiment of the invention such changes in voltage however are balanced against a change in voltage across the resistance 58, which is the voltage applied to the screen grid of the tube 46. By this method of balancing voltages approximately one-half of the residual voltage; i. e., voltage variations so small as not to be controlled by the regulator tubes 28 and 29, may be compensated. Small spontaneous changes due to operation of these tubes are also compensated for in this manner. The remainder of the residual voltage change is compensated by obtaining the plate voltage of the tube 46 from a point between the resistance 32 and 33. Thus, if a small voltage change occurs across the resistance 32, the change is proportional to the change in the direct current supply voltage because it is proportional to the current change in the resistance 32 and may be used to shift the plate voltage of the tube 46 and hence the grid voltage of tube 47 sufficiently to wipe out the remainder of the residual voltage fluctuation. The net result is that with the two regulator tubes and the two means of voltage compensation described herein the power supply voltage may vary over a wide range without appreciably effecting meter readings. Because of the relatively small voltage signal required and because any changes in resistance or tube constants are fed back to the input as voltage changes and are thus compensated, as described, this amplifier is highly linear and exceptionally stable.

In general measuring instruments of the type described herein are designed to be used with very high resistance potential sources such as the glass electrodes 63 and 65. The use of such electrodes always presents a problem insofar as leakage is concerned. To minimize leakage it is important that the input conductor 49 to the amplifier circuit be well insulated; however, the best of insulation sometimes fails especially under humid conditions. Accordingly, one phase of the invention is the provision of means for minimizing, if not entirely eliminating, leakage between the input conductor 49 and associated circuit parts. This is effected in this embodiment of the invention by a guard circuit 131 which is energized at substantially the same potential as the grid of the tube 46. The guard circuit includes a metallic sheath encircling the input conductor 49 and is connected to ground through a conductor 132. The circuit for the guard circuit is energized from the bleeder resistance through a conductor 133 connected to ground and to a mid-tap on the asymmetry potential resistance 54 of the bleeder resistance. With this arrangement the potential of the guard circuit is substantially the same as the potential of the grid under all conditions as shown hereinafter. Assume that the external voltage between the electrodes 63 and 65 is zero and that the variable tap on the potentiometer 54 is directly opposite the connection of the conductor 133 with the potentiometer 54. Under these conditions the flow of current through the feed-back resistance is zero. Hence, the voltage drop across the feed-back resistance is zero and the voltage on the guard 131 will be the same as the grid of the tube 46. Assume that a potential exists between the electrodes 63 and 65. Under these conditions current flows through the feed-back resistance and a voltage is developed across the feed-back resistance which is substantially equal to within a millivolt or so, and is opposed to the potential between the electrodes 63 and 65. Thus, the guard 131 is still substantially at the same potential as the grid of the tube 46.

If for any reason it should be necessary to apply an internal voltage in the instrument to compensate for the asymmetry potential of the glass electrode, it may be applied in the instrument by moving the contact of control 54 away from its center or grounded point to a new position such that the difference of potential between this new position and the grounded center will be equal and opposite to the asymmetry potential. Under these conditions this potential drop in potentiometer 54 will balance the asymmetry potential of the electrode itself and it is evident that the grid of the tube 46 and the guard circuit 131 will still be at substantially the same potential.

To prevent pick-up of stray potential from electrical fields in the laboratory or other place of use of the instrument, a filter 136 may be connected between the input conductors 49 and 51 as shown. The filter is of conventional construction and includes the resistances 137, 138 and 139 and condensers 141 and 142 connected between the conductors 49 and 51, as shown. In this embodiment of the invention the resistance 137 has a rating of 47 megohms, the resistance 138 a rating of 47 megohms, the resistance 139 a rating of 22 megohms, the condenser 141 a rating of 1000 micromicrofarads and the condenser 142 a rating of 200 micromicrofarads. The filter 136 permits the electrodes 63 and 65 to have considerable exposed area without causing fluctuation in meter readings due to electrostatic pick-up. Ordinarily, the use of such a filter renders a circuit very slow to respond to voltages being measured. In this embodiment of the invention however, a very satisfactory speed of response is obtained. This is due in part to the fact that there are no by-pass condensers in the amplifier circuit. In general, this would result in any stray alternating current that might be present in the vicinity of the amplifier also being amplified by the amplifier and ultimately cause the amplifier to oscillate. This is avoided in this circuit by a small neutralizing condenser 144 having a rating of 200 micromicrofarads connected between the plates of the tubes 46 and 47. With this construction any tendency to oscillate results in the signal being sent back from the plate of tube 47 to the plate 46 and hence to the grid of the tube 47 in such a phase relation or direction as to substantially oppose and wipe itself out.

Another factor adding to the speed of response of this instrument is the elimination of slow drift which would otherwise appear immediately after the electrodes had been washed or handled and would result in the proper pH value being reached at a very slow rate; that is, after a lapse of time of perhaps a substantial fraction of a minute. Such slow drifts are very often not the fault of the electrode or of the amplifier itself but of the presence in the insulating system of the high resistance lead of a poor grade of insulation. However, even with the best grade of insulation such effects can occur if the difference of potential between the instrument itself particularly its case, and ground or the operator, who is usually at ground potential, is very high. Such a difference of potential can easily result from capacitative effects in the power supply and circuits of the instrument and in extreme cases charge the instrument up to from 50 to 100 volts above ground potential. The elimination of such charge-up substantially increases the speed of response of the instrument by eliminating slow drift due to charging up the insulating material in the high resistance lead. The elimination of potential build-up is effected in this embodiment of the invention by the use of a pair of resistances 146 and 147, rated 47 megohms, connected across the power supply input leads 13 and 14 and having the center point between these resisters connected to the case of the instrument or ground through a conductor 148. With such a circuit arrangement the case of this instrument will have a potential which does not exceed more than 2 or 3 volts above ground potential because the capacitative charge-up is leaked off through these high resisters. These resisters have sufficient resistance so that no shock hazard is involved.

A shorting switch 161 for shorting the input leads 49 and 51 is connected in series in a conductor 162. The latter as shown in Figure 1 is connected between the juncture between the resistances 138 and 139 and a portion of the conductor 51 connected to the switch 64.

While the switches 64, 70, 71, 79, 77, 119, 121, 123, 114 and 161 may be individual switches accessible from the exterior of the instrument, it is preferred that for simplicity of operation that the switches be incorporated in a single compact multiple deck selector switch of conventional construction which may be actuated by a single dial or knob 151 (see Fig. 2) with a pointer movable between a plurality of annular positions designated "start," 0–8 pH, "neutral," 6–14 pH, 0–800 mv., 0 mv., and 600–1400 mv.

In the "start" position of the dial 151 the meter shorting switch 119 is closed. This makes it possible to check the meter 118 while the instrument is warming up or at any subsequent time without the necessity for turning the instrument off. The switch 161 is closed, shorting the leads 49 and 51. The input conductor switches 70 and 71, the screen grid circuit switch 79, the plate circuit switch 77 and the meter resistance switch 123 are open. Preferably, the filament of the tube 46 should not be permitted to drop below operating temperature while a positive voltage is still applied to the plate or screen grid of the tube 46. If a voltage is applied to the grid and plate while the filament is below normal temperature a temporary change in the tube characteristics may take place and it may take several hours to obtain a stable operating condition. By following the above precautions it has been found possible to operate this instrument without appreciable drift of the meter reading for relatively long periods of time. Accordingly, the operator is not required to check on the condition of the amplifier to see whether it has drifted because with this construction and its mode of operation the drift has been minimized, if not entirely eliminated.

In addition, the switch 114 is open, which removes the plate current load of the tube 48 from the circuit so that a substantially higher starting voltage for the voltage regulator tube 29 is available. This is one of the contributing factors that makes it possible to cascade the tubes 28 and 29 as shown in Figure 1. In normal usage the instrument is allowed to warm up for a short period of time before readings are taken.

In the 0–8 pH scale position of the dial 151, the switches 70, 71, 77, 79 and 114 are closed while the switches 119, 123 and 161 are open and the switch 64 is positioned so that the feed-back resistance circuit includes the fixed resistance 67 and the potentiometer 68. The meter 118 is biased through the conductor 125 and resistance 124 so that rated current flows through the meter when potential between the electrodes 63 and 65 is zero. This feature makes it practical to use electrodes whose pH scale starts at zero millivolts for zero pH and still maintain the voltage on the grid to the tube 46 and the shield circuits at substantially the same value. In the 8–14 pH position of the dial 151 the switches 70, 71, 77, 79, 114, 119, 64 and 161 are in the same position as when the dial is at the 0–8 pH setting. The reversing switch 121 however is in its other or reversing position. Thus, in the lower range the meter needle moves in one direction; in the upper range it moves in the other direction for increasing values. The total swing of the needle meter is thus twice full scale.

When the dial 151 is in the neutral position, which is between the pH settings, the switches 70, 71, 79, 114, 119 and 64 are in the same position as for the pH settings. However, the switch 161 is closed shorting the leads 49 and 51 and the switch 123 is closed so that the resistance 122 is shunted across the meter 118. Normally the meter would read zero but because the meter 118 is now connected in parallel with resistance 122 the needle is deflected to read approximately half scale. By adjusting the resistance a desired reading may be obtained. By periodically adjusting the dial 151 to the neutral setting, the drift of the needle and in turn the drift of the circuit from its original setting may be checked. As pointed out previously, this construction is such that the drift is very small.

In the 0–800 mv. setting of the dial 151, the selector switch 64 is positioned so that the feed-back resistance 66 is utilized and the resistance 68 and potentiometer 67 are out of the circuit, the switches 70, 71, 77, 79 and 114 are in their closed position, the switches 119, 123 and 161 are opened and the switch 121 is positioned so current flows through the meter in the proper direction. Otherwise the instrument is used in the same manner as for determining pH readings.

In the 0 mv. setting of the dial the switches, except for switch 161, are in the same position as for the 0–800 mv. setting. The switch 161 is closed shorting the input leads 49 and 51 together as in the neutral setting. The resistance 122 is not shunted across the meter 118 and consequently the meter will read zero under the above conditions if the resistance 54 is properly adjusted.

In the 600–1400 mv. position of the dial the switches, except for the switch 121, are in the same position as for the 0–800 mv. scale. The switch 121 in this instance is in its reversing position.

To facilitate the setting of the resistance 50 when the instrument is initially adjusted so that the center of the resistance 54 will be actually at the same potential as the grid 46, the resistance or potentiometer is so constructed that the operator, by adjusting the resistance and watching the resulting movement of the needle on the meter, will notice a region in the center of the resistance where no change in the meter reading takes place, although the resistance is still being progressively changed. If the resistance 54 is placed at this position when the instrument is in the 0 mv. position and the resistance 50 then adjusted to bring the meter to exactly 0, the center of the resistance 54, together with the conductor 133 and ground and guard circuit 131 will be at the same potential as the grid of the tube 46, which is the desired condition for most effective operation of the guard circuit 131. It can be readily seen that this particular control means makes the adjustment of the potential condition described a simple matter for the operator at any time.

This instrument may also be used for observing voltage variations between two electrodes immersed in a solution whose conductivity is being measured in such reactions as the Karl Fischer reaction. To this end another circuit is included in the instrument which includes the conductor 152, the resistance 153 and the switch 154. The conductor is attached at one end to the conductor 38 between the resistance 41 and the regulator tube 28 and is connected at its other end through the switch 154 to the conductor 49. The resistance 153 has a rating of 6.8 megohms. In operation the switch 154 is closed so that a fixed biasing potential is supplied to the electrode leads 49 and 51 which causes a current to flow through the solution. When the conductivity of the solution decreases, as it does sharply at the end point in the above reaction, the voltage across the electrodes will rise very suddenly and the instrument will indicate this end point.

I claim:

1. A pH electrometer, comprising a glass test electrode, a multi-tube direct-coupled amplifier, a circuit connecting said test electrode to the input of the amplifier and including a filter eliminating stray electrostatic potentials picked up by the test electrode, and a neutralizing condenser connected between the plates of successive tubes in the amplifier to prevent oscillations in the amplifier without impairing the speed of response of the amplifier.

2. In a measuring instrument, the combination of a test electrode, an instrument case, a direct-coupled amplifier within said instrument case, an insulated lead extending from said test electrode and coupled to the input of said amplifier for the amplification of the signals from the test electrode, a transformer, conductors for connecting the primary of said transformer across a source of alternating current, a rectifier in the secondary circuit of said transformer for rectifying the transformer output voltage, voltage regulating means connected between said rectifier and said amplifier to provide a regulated D. C. power supply for said amplifier, and a pair of equal high resistances connected in series across the primary of said transformer, the juncture between said series-connected resistances being grounded to the intrument case to bleed off through the resistances any capacitative charge built up on the instrument case.

3. In an ion activity measuring apparatus including a glass test electrode and a reference electrode, a multistage direct-connected amplifier including a series of electron discharge devices each having a cathode, a control electrode, and a plate, a regulated power supply for said amplifier having a bleeder resistance connected across the output thereof, means connecting a first tap on said bleeder resistance to the cathode of the first of the series of said discharge devices to apply a predetermined bias thereto, said bleeder resistance including an asymmetry balancing potentiometer connected in series therewith and having an adjustable tap thereon, a degenerative feedback circuit for said amplifier including a feedback resistor connected between the output of one of the series of discharge devices and the tap on said potentiometer, and an input circuit connecting the glass electrode to the control electrode of said first discharge device and connecting the reference electrode to the end of said feedback resistor remote from said adjustable tap.

4. In an ion activity measuring apparatus including a glass test electrode and a reference electrode, a multistage direct-connected amplifier including a series of electron discharge devices each having a cathode, a control electrode, and a plate, a regulated power supply for said amplifier having a bleeder resistance connected across the output thereof, said bleeder resistance including an asymmetry balancing circuit connected to the low potential side of said power supply and a biasing resistor connected to the balancing circuit in series therewith, means connecting the side of said biasing resistor remote from said balancing circuit to the cathode of the first of said discharge devices to apply a predetermined bias thereto, said balancing circuit including a pair of resistors having a grounded tap therebetween and a potentiometer connected in parallel with said last named resistors, a degenerative feedback circuit for said amplifier including a feedback resistor connected between the output of one of the series of discharge devices and the tap on the potentiometer, an input circuit for said amplifier including a first conductor connecting the glass electrode to the control electrode of the first discharge device and a second conductor connecting the reference electrode to the end of the feedback resistor remote from said adjustable tap, and a conductive sheath surrounding said first conductor and insulated therefrom, and means grounding said sheath to said grounded tap between said resistors in the balancing circuit to maintain the sheath at substantially the same potential as the control electrode of the first discharge device.

5. The combination of claim 4 including a neutralizing condenser connecting the plate of the second of said discharge devices to the plate of said first discharge device for suppressing oscillations in said amplifier.

6. In an amplifier for amplifying low level signals, an input stage comprising an electron discharge device having a cathode, a control electrode, and a plate, a source of D. C. power having a pair of output connections, one of said connections being at a positive potential with respect to the other, a glow tube voltage stabilizer circuit means connected to said output connections of said source of power to provide a regulated D. C. voltage across the glow tube, a bleeder resistance connected directly across the glow tube and having a tap thereon connected to the cathode for applying a predetermined bias thereto, said stabilizer circuit means including a compensating resistor connected in series therewith between the positive potential end of said bleeder resistance and said one of said connections of said voltage source with one end of said compensating resistor directly connected to the positive potential end of both the bleeder resistance and the glow tube to produce a voltage drop thereacross correlative with the current flowing through said voltage stabilizer circuit means, means for applying the voltage at the side of said compensating resistor remote from said bleeder resistance to the plate of said discharge device to provide a voltage at the plate that varies, with, and compensates for, the changes in cathode bias caused by variations in the output voltage of the power source.

7. In an amplifying system including a series of direct-coupled electron discharge devices each having a cathode, a control electrode and a plate, a D. C. supply source having a pair of output connections, one of said connections being at a positive potential with respect to the other connection, a glow tube voltage stabilizer circuit means connected to said output connections of said supply source for providing a regulated D. C. voltage across the glow tube, a bleeder resistance connected directly across the glow tube in said voltage stabilizer circuit means and having a tap thereon connected to the cathode of the first of said discharge devices for applying a predetermined bias thereto, said stabilizer circuit means including a compensating resistor connected in series therewith between the positive potential end of said bleeder resistance and said one of said terminals of said voltage source with one end of the compensating resistor directly connected to the positive potential ends of both the bleeder resistance and the glow tube for producing a voltage drop thereacross correlative with the current flowing through said stabilizer circuit means, means for applying the potential at the side of said compensating resistor remote from said bleeder resistance to the plate of the first of said discharge devices to provide a voltage at the plate of the first discharge device which varies with, and compensates for, the changes in cathode bias on the first discharge device produced by variations in the output voltage of the supply source.

8. In an amplifying system including a series of direct-coupled electron discharge devices each having a filament-type cathode, a control electrode, and a plate, a D. C. supply source having a pair of output connections, one of said connections being at a positive potential with respect to the other connection, a glow tube voltage stabilizer circuit means connected to said output connections of said supply source to provide a regulated D. C. voltage across the glow tube, a bleeder resistance connected directly across the glow tube in said stabilizer circuit means and having the filaments of said discharge devices connected thereto, said stabilizer circuit means including a compensating resistor connected in series therewith between the positive potential end of said bleeder resistance and said one of said output connections of said supply source with one end of the compensating resistor directly connected to the positive potential ends of both the bleeder resistance and the glow tube to produce a voltage drop thereacross correlative with the current flowing through said stabilizer circuit means, means for applying the potential at the end of said compensating resistor remote from said bleeder resistance to the plate of the first of said discharge devices to provide a voltage thereat which varies with, and compensates for, changes in cathode bias of the first discharge device produced by variations in the output voltage of the supply source.

9. In an amplifying system, including a series of direct-coupled electron discharge devices each having a filament-type cathode, a control electrode, and a plate, a D. C. supply source having a pair of output connections, one of said connections being at a positive potential with respect to the other, a glow tube voltage stabilizer circuit means connected to said output connections of said supply source to provide a regulated D. C. voltage across the glow tube, a bleeder resistance connected directly across the glow tube in said stabilizer circuit means and having the filaments of said discharge devices connected thereto, the first of said discharge devices having a screen grid, means connecting the screen grid to said bleeder resistance, said stabilizer circuit means including a compensating resistor connected in series therewith between the positive potential end of said bleeder resistance and said one of said output connections of said supply source with one end of the compensating resistor directly connected to the positive potential ends of both the bleeder resistance and the glow tube to produce a voltage thereacross correlative with the current flowing through said stabilizer circuit means, means for applying the potential at the end of said compensating resistor remote from said bleeder resistance to the plate of said first discharge device, the voltages applied to the screen grid and plate of said first discharge device varying with and compensating for the changes in cathode bias of the first discharge device produced by variations in the output voltage of the supply source.

10. In an amplifier for amplifying low level signals, an electron discharge device having a cathode, a control electrode and an accelerating electrode, a source of unregulated D. C. power having a pair of output connections, one of said connections being at a positive potential with respect to the other connection, a first glow tube voltage stabilizer circuit means including a resistance and a glow tube connected in series with each other and to said output connections of said source of power to provide a regulated D. C. voltage across the glow tube, a second glow tube voltage stabilizer circuit means connected in cascade with said first circuit means and including a resistance and a glow tube connected in series across the glow tube of the first circuit means with one side of the glow tube in the second circuit means directly connected to the positive potential side of the glow tube in the first circuit means, a bleeder resistance directly connected across the glow tube in said second circuit means and having a first tap and an end connection at a positive potential with respect to said first tap, means connecting said first tap to the cathode of the discharge device for applying a predetermined bias thereto, a compensating resistor connected in series with the first stabilizer circuit means between said end connection of the bleeder resistance and said one of said connections of said source of power with one end thereof directly connected to said end connection of the bleeder resistance and to the positive potential ends of said glow tubes for producing a compensating voltage correlative in amplitude with the current flowing through said first stabilizer circuit means and for adding the compensating voltage to the voltage at said end connection of the bleeder resistance, and means connecting the end of said compensating resistor remote from said bleeder resistance to said accelerating electrode for applying the sum of the voltage at said end connection of the bleeder resistance and said compensating voltage to the accelerating electrode of said discharge device to provide a voltage at the accelerating electrode which varies with, and compensates for, the changes in the cathode bias caused by variations in the output voltage of the power source.

References Cited in the file of this patent

UNITED STATES PATENTS

| Number | Name | Date |
| --- | --- | --- |
| 1,193,076 | Schon | Aug. 1, 1916 |
| 1,821,780 | Allen | Sept. 1, 1930 |
| 1,972,268 | Lesh | Sept. 4, 1934 |
| 1,973,082 | Koros | Sept. 11, 1934 |
| 2,204,204 | Baier | June 11, 1940 |
| 2,223,188 | Shofstall | Nov. 26, 1940 |
| 2,269,082 | Herriger | Jan. 6, 1942 |

(Other references on following page)

UNITED STATES PATENTS

| | | |
|---|---|---|
| 2,292,439 | Golicke | Aug. 11, 1942 |
| 2,302,900 | Vance | Nov. 24, 1942 |
| 2,442,690 | Hoffman et al. | June 1, 1948 |
| 2,458,632 | Parsons | Jan. 11, 1949 |
| 2,459,081 | Kunz | Jan. 11, 1949 |
| 2,459,846 | Smyth et al. | Jan. 25, 1949 |
| 2,476,803 | Booth | July 19, 1949 |
| 2,514,745 | Dalzell | July 11, 1950 |
| 2,536,465 | Reeves | Jan. 2, 1951 |
| 2,536,617 | Weller | Jan. 2, 1951 |
| 2,541,198 | Brenholdt | Feb. 13, 1951 |
| 2,542,293 | Smith et al. | Feb. 20, 1951 |
| 2,545,759 | Binneweg | Mar. 20, 1951 |
| 2,558,108 | Smith | June 26, 1951 |
| 2,573,523 | Watters | Oct. 30, 1951 |
| 2,585,008 | Hallmark | Feb. 12, 1952 |
| 2,598,259 | Hogue | May 27, 1952 |
| 2,609,527 | Raburn et al. | Sept. 2, 1952 |
| 2,623,996 | Gray | Dec. 30, 1952 |
| 2,644,088 | Cooper et al. | June 30, 1953 |

OTHER REFERENCES

Radio Engineering, by F. E. Terman, 3d ed., McGraw-Hill Book Co., Inc.